United States Patent
Chatterjee (10) Patent No.: US 11,051,306 B2
(45) Date of Patent: Jun. 29, 2021

(54) SCRAMBLING FOR CONTROL MESSAGES

(71) Applicant: Intel IP Corporation, Santa Clara, CA (US)

(72) Inventor: Debdeep Chatterjee, San Jose, CA (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 16/095,667

(22) PCT Filed: Dec. 2, 2016

(86) PCT No.: PCT/US2016/064822
§ 371 (c)(1),
(2) Date: Oct. 22, 2018

(87) PCT Pub. No.: WO2017/196393
PCT Pub. Date: Nov. 16, 2017

(65) Prior Publication Data
US 2019/0150155 A1 May 16, 2019

Related U.S. Application Data

(60) Provisional application No. 62/336,389, filed on May 13, 2016.

(51) Int. Cl.
*H04W 72/04* (2009.01)
*H04L 5/00* (2006.01)
(Continued)

(52) U.S. Cl.
CPC ......... *H04W 72/0466* (2013.01); *H04L 1/004* (2013.01); *H04L 5/0053* (2013.01); *H04W 72/042* (2013.01); *H04W 88/02* (2013.01)

(58) Field of Classification Search
None
See application file for complete search history.

(56) References Cited

U.S. PATENT DOCUMENTS

| | | | |
|---|---|---|---|
| 8,582,538 B2* | 11/2013 | Love | H04L 1/0029 370/335 |
| 2014/0293908 A1* | 10/2014 | Kumar | H04W 48/12 370/329 |

(Continued)

FOREIGN PATENT DOCUMENTS

| CN | 102694709 A | 9/2012 |
|---|---|---|
| CN | 104170297 A | 11/2014 |
| CN | 105453554 A | 3/2016 |

OTHER PUBLICATIONS

3GPP TS 36.211; "3$^{rd}$ Generation Partnership Project; Technical Specification Group Radio Access Network; Evolved Universal Terrestrial radio Access (E-UTRA); Physical Channels and Modulation;" (Mar. 2016); 155 pages; V13.1.0; (Release 13).

(Continued)

*Primary Examiner* — Bunjob Jaroenchonwanit
(74) *Attorney, Agent, or Firm* — Alliance IP, LLC (57) ABSTRACT

Technology for an eNodeB operable to apply scrambling to coded bits transported via a physical downlink shared channel (PDSCH) to a user equipment (UE) is disclosed. The eNodeB can generate a code word that comprises coded bits for transmission to the UE. The UE can be a bandwidth-reduced low complexity (BL) UE or a coverage enhancement (CE) UE. The eNodeB can identify, for the BL UE or the CE UE, a scrambling sequence to be applied to the coded bits. The scrambling sequence can be initialized using a defined initialization value ($c_{init}$). The eNodeB can apply the scrambling sequence with the defined initialization value to (Continued)

the coded bits to obtain scrambled coded bits. The eNodeB can encode the scrambled coded bits for transmission to the UE via the PDSCH.

13 Claims, 7 Drawing Sheets

(51) Int. Cl.
*H04L 1/00* (2006.01)
*H04W 88/02* (2009.01)

(56) References Cited

U.S. PATENT DOCUMENTS

| | | | | |
|---|---|---|---|---|
| 2014/0357272 | A1* | 12/2014 | Axmon | H04L 5/0053 455/434 |
| 2015/0016312 | A1* | 1/2015 | Li | H04L 5/14 370/280 |
| 2015/0131599 | A1* | 5/2015 | Xue | H04W 72/1226 370/329 |
| 2015/0257173 | A1* | 9/2015 | You | H04L 1/1864 370/330 |
| 2015/0319701 | A1* | 11/2015 | Ng | H04W 52/143 370/311 |
| 2016/0095076 | A1* | 3/2016 | Xiong | H04W 4/70 370/336 |
| 2016/0135124 | A1* | 5/2016 | Vos | H04W 52/0216 370/311 |
| 2016/0270038 | A1* | 9/2016 | Papasakellariou | H04W 72/042 |
| 2016/0316491 | A1* | 10/2016 | Axmon | H04W 4/70 |
| 2017/0105166 | A1* | 4/2017 | Lee | H04W 68/005 |
| 2017/0135029 | A1* | 5/2017 | Chendamarai Kannan | H04W 8/005 |
| 2017/0164400 | A1* | 6/2017 | Fong | H04W 72/14 |
| 2017/0273079 | A1* | 9/2017 | Park | H04W 72/042 |
| 2017/0289965 | A1* | 10/2017 | You | H04W 56/001 |
| 2017/0310431 | A1* | 10/2017 | Iyer | H04L 1/1816 |
| 2017/0332359 | A1* | 11/2017 | Tsai | H04B 7/0639 |
| 2018/0007585 | A1* | 1/2018 | Takeda | H04L 1/08 |
| 2018/0115943 | A1* | 4/2018 | Park | H04L 5/00 |
| 2018/0124644 | A1* | 5/2018 | Rico Alvarino | H04L 5/0048 |
| 2018/0255529 | A1* | 9/2018 | Yu | H04W 72/1289 |
| 2019/0036647 | A1* | 1/2019 | Gowda | H04W 52/0229 |
| 2019/0037569 | A1* | 1/2019 | Lee | H04W 72/0453 |
| 2019/0090219 | A1* | 3/2019 | Lee | H04L 1/1819 |
| 2019/0116592 | A1* | 4/2019 | Moon | H04L 5/0044 |
| 2019/0123864 | A1* | 4/2019 | Zhang | H04B 7/088 |
| 2019/0158263 | A1* | 5/2019 | Lee | H04L 5/143 |
| 2019/0215815 | A1* | 7/2019 | Blankenship | H04L 5/0053 |
| 2019/0319764 | A1* | 10/2019 | Nader | H04W 72/0453 |
| 2020/0015098 | A1* | 1/2020 | Basu Mallick | H04W 16/26 |
| 2020/0015262 | A1* | 1/2020 | Ahn | H04J 11/0079 |
| 2020/0021408 | A1* | 1/2020 | Shimezawa | H04L 5/0064 |

OTHER PUBLICATIONS

3GPP TS 36.331; "3$^{rd}$ Generation Partnership Project; Technical Specification Group radio Access Network; Evolved Universal Terrestrial Radio Access (E-UTRA); Radio Resource Control (RRC); Protocol Specification;" (Jun. 2016); pp. 28-29; 40; V12.10.0; (Release 12).

Ericsson; "Introduction of NB-IoT;" 3Gpp TSG R1-163952; (May 10, 2016); 23 pages; RAN WG1 Meeting #84bis, Busan, Korea; 36.211 Change Request: 0224, rev: 6, Current version: 13.1.0; (Rel-13).

ETSI TS 136 211; "LTE; Evolved Universal Terrestrial Radio Access (E-UTRA); Physical Channels and Modulation;" 3GPP TS 36.211; (Apr. 2016); 157 pages; Section 6.3.1; V13.1.0; (Release 13).

ETSI TS 136 213; "LTE; Evolved Universal Terrestrial Radio Aceess (E-UTRA); Physical Layer Procedures;" 3GPP TS 36.213; (May 2016); 328 pages; Section 7.1; V13.0.0; (Release 13).

Samsung; "System Information Signalling in NR;" 3GPP TSG R2-162215; (Apr. 11-15, 2016); 7 pages; RAN WG2 Meeting #93, Dubrovnik, Croatia; (Agenda 9.4.3).

WI Rapporteur (Ericsson); "RAN1 Agreements for Rel-13 NB-IoT;" 3GPP TSG R1-163943; (Apr. 11-15. 2016); 28 pages; RAN WG1 Meeting #84bis, Busan, Korea; (Agenda 7.2.1).

International Search Report dated Feb. 16, 2017, in International Application No. PCT/US2016/064822, filed Dec. 2, 2016; 4 pages.

EPO; Office Action issued in EP Patent Application No. EP 16816114.9, dated Aug. 10, 2020; 5 pages.

SIPO; First Office Action issued in CN Patent Application No. 201680084563.0, dated Mar. 1, 2021; 17 pages including English translation.

EPO; Office Action issued in EP Patent Application No. 16816114.9, dated Mar. 30, 2021; 8 pages.

Nokia et al.; "Scrambling Sequence for paging MPDCCH and PDSCH," 3GPP TSG RAN WG1 Meeting #85, R1-165578; Nanjing, China; May 24, 2016; 5 pages.

* cited by examiner

SCRAMBLING FOR CONTROL MESSAGES

BACKGROUND

Wireless mobile communication technology uses various standards and protocols to transmit data between a node (e.g., a transmission station) and a wireless device (e.g., a mobile device). Some wireless devices communicate using orthogonal frequency-division multiple access (OFDMA) in a downlink (DL) transmission and single carrier frequency division multiple access (SC-FDMA) in uplink (UL). Standards and protocols that use orthogonal frequency-division multiplexing (OFDM) for signal transmission include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi.

In 3GPP radio access network (RAN) LTE systems (e.g., Release 13 and earlier), the node can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicates with the wireless device, known as a user equipment (UE). The downlink (DL) transmission can be a communication from the node (e.g., eNodeB) to the wireless device (e.g., UE), and the uplink (UL) transmission can be a communication from the wireless device to the node.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Reference will now be made to the exemplary embodiments illustrated, and specific language will be used herein to describe the same. It will nevertheless be understood that no limitation of the scope of the technology is thereby intended.

DETAILED DESCRIPTION

Before the present technology is disclosed and described, it is to be understood that this technology is not limited to the particular structures, process actions, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating actions and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

The ability to support an increased number of Cellular Internet of Things (CIoT) or Machine-Type Communications (MTC) devices is a key objective for next-generation cellular wireless networks, such as Fifth Generation (5G) cellular wireless networks. CIoT and MTC devices are low complexity and latency-tolerant. In addition, CIoT and MTC devices can be associated with a relatively low throughput and reduced power consumption. In 3GPP Release 13, low complexity MTC devices can support a bandwidth of 1.4 megahertz (MHz) on the downlink (DL) and uplink (UL) at both a radio frequency (RF) and a baseband irrespective of a system bandwidth (BW). In 3GPP Release 13, such low complexity MTC devices can be referred to as Release 13 low complexity (LC) UE or Category (Cat) M1 devices.

In addition, 3GPP Release 13 has introduced a design for narrowband Internet of Things (NB-IoT). For NB-IoT systems, a radio access technology (RAT) for CIoT can be defined based on a non-backward-compatible variant of the evolved Universal Mobile Telecommunications System (UMTS) Terrestrial Radio Access (E-UTRA) standard, and can be specifically tailored towards improved indoor coverage, support for an increased number of low throughput devices, low delay sensitivity, low device complexity and cost, low device power consumption and an improved network architecture. Furthermore, the NB-IoT system can support low complexity devices that support only a 180 kilohertz (kHz) UE RF bandwidth for both DL and UL, in three different modes of operation stand-alone deployment, NB-IoT deployment in a guard band of an LTE carrier, and NB-IoT deployed in-band. A NB-IoT carrier can include one legacy LTE physical resource block (PRB) for in-band mode and its equivalent in stand-alone/guard-band modes, corresponding to a system bandwidth of 180 kHz.

As described in the present technology, scrambling can be applied to coded bits carried by a physical downlink shared channel (PDSCH) or narrowband PDSCH (NPDSCH) for enhanced MTC (eMTC) and NB-IoT systems, respectively. More specifically, scrambling can be applied to a system information block 1 (SIB1) bandwidth reduced (BR), other types of system information (SI) messages and paging records carried by the PDSCH with respect to eMTC systems. In addition, scrambling can be applied to the SIB1-NB and other types of SI messages carried by the NPDSCH with respect to NB-IoT systems. In other words, the coded bits can include the SIB1-BR, the SIB1-NB, SI messages and paging records. With respect to both the eMTC and NB-IoT systems, a scrambling initialization can be determined and applied to the coded bits.

Scrambling Initialization for PDSCH in eMTC

Figure 1:
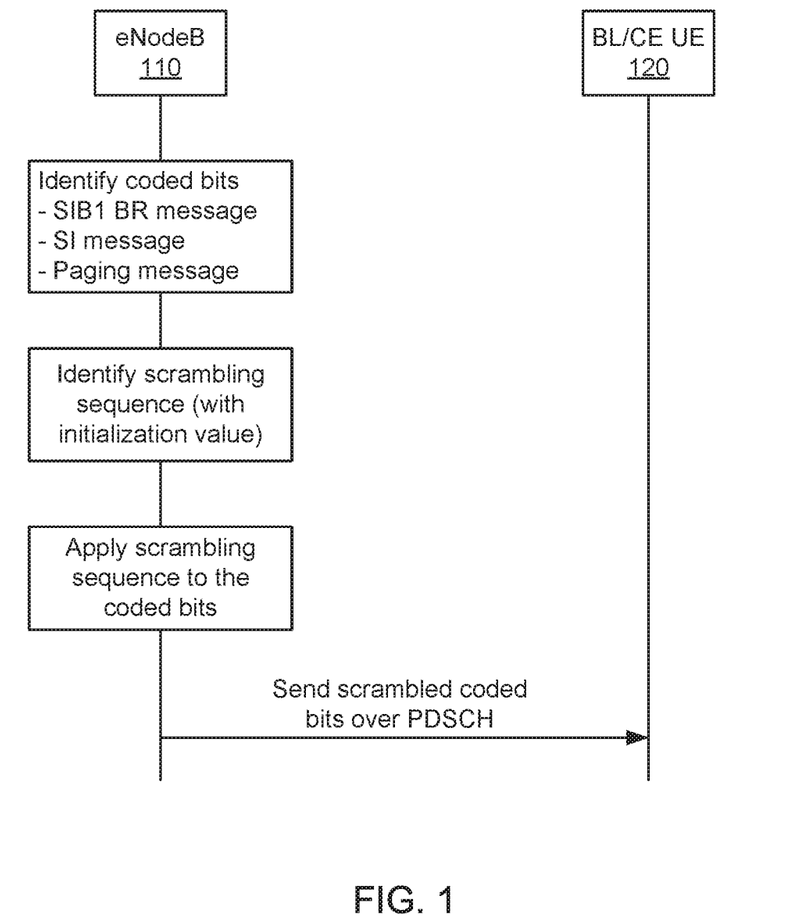
FIG. 1 illustrates signaling between an eNodeB and a user equipment (UE) via a physical downlink shared channel (PDSCH) in accordance with an example.

FIG. 1 illustrates exemplary signaling between an eNodeB 110 and a bandwidth-reduced low complexity (BL) user equipment (UE) or a coverage enhancement (CE) UE 120 (collectively referred to as a BL/CE UE 120) via a physical downlink shared channel (PDSCH). The BL/CE UE 120 can refer to an enhanced machine type communication (eMTC) UE. As shown in FIG. 1, the eNodeB 110 can apply scrambling operation to coded bits transported via the PDSCH to the BL/CE UE 120. The eNodeB 110 can identify coded bits for transmission to the BL/CE UE 120. The coded bits form one of: a system information block type 1 (SIB1) bandwidth reduced (BR), a type of system information (SI) message other than a SIB1 BR, or a paging message. The eNodeB 110 can identify a scrambling sequence to be applied to the coded bits. The scrambling sequence can be based on a pseudorandom sequence that is initialized using a defined initialization value ($c_{init}$). The eNodeB 110 can apply the scrambling sequence with the defined initialization value to the coded bits. Finally, the eNodeB 110 can transmit scrambled coded bits to the BL/CE UE 120 via the PDSCH.

In one example, for each codeword q, a block of bits $b^{(q)}(0), \ldots, b^{(q)}(M_{bit}^{(q)}-1)$, where $M_{bit}^{(q)}$ is a number of bits in codeword q transmitted on a physical channel in one subframe, can be scrambled prior to modulation, which can produce a block of scrambled bits $\tilde{b}^{(q)}(0), \ldots, \tilde{b}^{(q)}(M_{bit}^{(q)}-1)$ according to $\tilde{b}^{(q)}(i)=(b^{(q)}(i)+c^{(q)}(i)) \mod 2$, where $c^{(q)}(i)$ is a defined scrambling sequence. A scrambling sequence generator can be initialized at the start of each subframe, where an initialization value of $c_{init}$ can depend on a transport channel type according to:

$$c_{init} = \begin{cases} n_{RNTI} \cdot 2^{14} + q \cdot 2^{13} + \lfloor n_s/2 \rfloor \cdot 2^9 + N_{ID}^{cell} & \text{for PDSCH} \\ \lfloor n_s/2 \rfloor \cdot 2^9 + N_{ID}^{MBSFN} & \text{for PMCH} \end{cases},$$

where $n_{RNTI}$ corresponds to a radio network temporary identifier (RNTI) associated with the PDSCH transmission, q represents the code word, $n_s$ represents a first slot of the transmission of the codeword, $N_{ID}^{cell}$ represents a cell identifier (ID), and $N_{ID}^{MBSFN}$ represents a multicast-broadcast single-frequency network (MBSFN) ID associated with a physical multicast channel (PMCH) transmission.

In one example, for BL/CE UEs, the same scrambling sequence can be applied per subframe to the PDSCH for a given block of $N_{acc}$ subframes. For the $j^{th}$ block of $N_{acc}$ subframes, the scrambling sequence generator can be initialized with an initialization value ($c_{init}$) as follows: $c_{init} = n_{RNTI} \cdot 2^{14} + q \cdot 2^{13} + [(j_0+j)N_{acc} \mod 10] \cdot 2^9 + N_{ID}^{cell}$, wherein $j_0$ represents a first block in the $N_{acc}$ subframes, and j represents a given block in the $N_{acc}$ subframes. In addition, the following equations can apply:

$$j = 0, 1, \ldots, \left\lfloor \frac{i_0 + N_{abs}^{PDSCH} + i_\Delta - 1}{N_{acc}} \right\rfloor - j_0$$

-continued $$j_0 = \lfloor (i_0 + i_\Delta)/N_{acc} \rfloor$$

$$i_\Delta = \begin{cases} 0, & \text{for frame structure type 1} \\ N_{acc} - 2, & \text{for frame structure type 2} \end{cases},$$

wherein $N_{abs}^{PDSCH}$ represents a total number of absolute subframes spanned by an NPDSCH with repetition, $i_0$ represents an absolute subframe number of a first downlink subframe intended for the PDSCH, and $i_\Delta$ represents a change in the absolute subframe number. The PDSCH transmission can span $N_{abs}^{PDSCH}$ consecutive subframes, which can include invalid subframes where the PDSCH transmission is postponed.

In one example, for a BL/CE UE configured in CE Mode A, $N_{acc}=1$. For a BL/CE UE configured with CE Mode B, $N_{acc}=4$ for frame structure type 1 and $N_{acc}=10$ for frame structure type 2.

In one configuration, for BL/CE UEs, $N_{acc}=1$ when the PDSCH is carrying a SIB1-BR. Otherwise, when the PDSCH is carrying an SI message (except for a SIB1-BR) or when the PDSCH transmission is associated with a paging radio network temporary identifier (P-RNTI), $N_{acc}=4$ for frame structure type 1 and $N_{acc}=10$ for frame structure type 2. In another configuration, $N_{acc}=1$ for UEs configured with CE Mode A, or $N_{acc}=4$ for frame structure type 1 and $N_{acc}=10$ for frame structure type 2 for UEs configured with CE Mode B. For a single codeword transmission, which can be typically expected for BL/CE or NB-IoT UEs, q is equal to zero.

In one example, the values for the above parameters can be determined for a PDSCH for unicast transmissions or for a PDSCH associated with a random access procedure (e.g., Message 2 or Message 4 transmissions), and the UE can determine a value of $N_{acc}$ based on a configured coverage enhancement (CE) mode after a radio resource control (RRC) connection is established, or based on a derived CE mode from a PRACH repetition level (for random access procedure). In addition, when the PDSCH is carrying a SIB1-BR, other SI messages or paging records, the determination of the $N_{acc}$ value can be performed as follows.

With respect to when the PDSCH carries a SIB1-BR for eMTC, for a subframe in which the SIB1-BR is transmitted, a transport block can be mapped to all 6 PRBs in a narrowband. The SIB1-BR can be transmitted on subframe 5 only, or subframes 0 and 5 in a radio frame depending on a number of repetitions configured for the SIB1-BR, as indicated using a master information block (MIB) carried by a physical broadcast channel (PBCH). Therefore, the repetitions may not be transmitted on consecutive subframes. Accordingly, there is minimal benefit in maintaining the same scrambling sequence beyond a single subframe. Therefore, in one example, the $N_{acc}$ value can be set to 1 for the PDSCH carrying the SIB1-BR.

With respect to when the PDSCH carries other types of system information (SI) message for eMTC, SI messages other than SIB1-BR can be transmitted within SI windows that are configured via the SIB1-BR. When acquiring an SI message, a BL/CE UE can determine a start of an SI window (SI-window) for a concerned SI message. For the concerned SI message, the BL/CE UE can determine a number (n) which corresponds to an order of entry in a list of SI messages configured by a scheduling information list (schedulingInfoList) in a system information block type BR (SystemInformationBlockType-BR). The BL/CE UE can determine an integer value x=(n=1)*w, where w is an SI window length (si-WindowLength-BR). The SI-window can start at subframe #0 in a radio frame for which a system frame number (SFN) mod T=FLOOR(x/10), where T is an SI periodicity (si-Periodicity) of the concerned SI message. In another example, the BL/CE UE can receive and accumulate SI message transmissions on a downlink shared channel (DL-SCH) on a narrowband (as provided by si-Narrowband), from a start of the SI-window and continue until an end of the SI-window whose absolute length in time is given by the SI window length (si-WindowLength-BR). The reception and accumulation of SI message transmission can occur in radio frames as provided in a repetition pattern (si-repetitionpattern), and subframes as provided in a frequency division duplexing (FDD) downlink or time division duplexing (TDD) subframe bitmap low complexity parameter (fdd-DownlinkOrTddSubframeBitmapLC) in an information element (IE) for bandwidth reduced related access related information (bandwidthReducedAccessRelated-Info), or until successful decoding of the accumulated SI message transmissions. In addition, if the SI message was unable to be decoded from the accumulated SI message transmissions by the end of the SI-window, the reception and accumulation of SI message transmissions on the DL-SCH can be repeated in a next SI-window occasion for the concerned SI message.

In one example, the repetition parameter (si-repetitionpattern) for eMTC can indicate the radio frames within an SI window that are used to carry the SI message. The PDSCH carrying the SI message can be mapped to consecutive valid DL subframes within a used radio frame, and is thus similar in terms of mapping of repetitions of the transport block (TB) as for the case of unicast PDSCH transmissions. Thus, the scrambling application can follow similar definitions as for unicast PDSCH.

In one example, the UE may not be configured with a CE mode (e.g., CE mode A or B) and thus, in one example, the UE behavior with respect to scrambling application for the PDSCH carrying SI messages can be aligned with the CE mode implied by the DL frequency hopping granularity indication in the SIB1-BR. Specifically, in one example, for scrambling initialization for the PDSCH carrying SI messages, if an interval downlink hopping configuration common mode B (interval-DlHoppingConfigCommonModeB) is signaled in the SIB1-BR, then $N_{acc}$=4 for frame structure type 1 (i.e., FDD systems) and $N_{acc}$=10 for frame structure type 2 (i.e., TDD systems). Otherwise, if an interval downlink hopping configuration common mode A (interval-DlHoppingConfigCommonModeA) is signaled in the SIB1-BR, then $N_{acc}$=1. Alternatively, irrespective of Mode A or Mode B, and irrespective of frame structure type 1 and frame structure type 2, $N_{acc}$ can be set to 4.

For both cases when the PDSCH is carrying the SIB1-BR or other SI messages, the $n_{RNTI}$ used in the scrambling initialization can be set to a system information radio network temporary identifier (SI-RNTI), although the PDSCH may not be dynamically scheduled using an MTC PDCCH (MPDCCH) carrying downlink control information (DCI) with a cyclic redundancy check (CRC) scrambled with the SI-RNTI. Alternatively, the $n_{RNTI}$ value can be fixed to a specified number.

In one configuration, the PDSCH can carry paging records for eMTC. For paging records that are carried via the PDSCH and scheduled using DCI format 6-2 with a CRC scrambled with a paging radio network temporary identifier (P-RNTI), the UE may not know a specific CE mode for determining the $N_{acc}$ value for the PDSCH scrambling. Further, for the PDSCH repetitions for paging, an entire range of PDSCH repetitions can be indicated dynamically via DCI 6-2: {1, 2, 4, 8, 16, 32, 64, 128, 192, 256, 384, 512, 768, 1024, 1536, 2048}.

Therefore, similar to the case of SI message transmissions, the UE behavior with respect to scrambling application for the PDSCH carrying paging messages can be aligned with the CE mode implied by the DL frequency hopping granularity indication in the SIB1-BR, since an application of the frequency hopping interval for the MPDCCH and PDSCH for paging can follow the DL frequency hopping granularity indication. Specifically, in one example, for scrambling initialization for the PDSCH carrying paging messages, if an interval downlink hopping configuration common mode B (interval-DlHoppingConfigCommonModeB) is signaled in the SIB1-BR, then $N_{acc}$=4 for frame structure type 1 (i.e., FDD systems) and $N_{acc}$=10 for frame structure type 2 (i.e., TDD systems). Otherwise, if an interval downlink hopping configuration common mode A (interval-DlHoppingConfigCommonModeA) is signaled in the SIB1-BR, then $N_{acc}$=1.

In one example, $N_{acc}$ can be determined based on a number of PDSCH repetitions indicated in the DCI format 6-2. For instance, for scrambling initialization for the PDSCH carrying paging messages, $N_{acc}$=1 when the number of PDSCH repetitions is less than 16. When the number of PDSCH repetitions is greater than or equal to 16, $N_{acc}$=4 (for FDD) and $N_{acc}$=10 (for TDD). Alternatively, irrespective of the number of PDSCH repetitions, $N_{acc}$=4 (for FDD) and $N_{acc}$=10 (for TDD) for the PDSCH carrying paging records.

Scrambling Initialization for NPDSCH in NB-IoT

Figure 2:
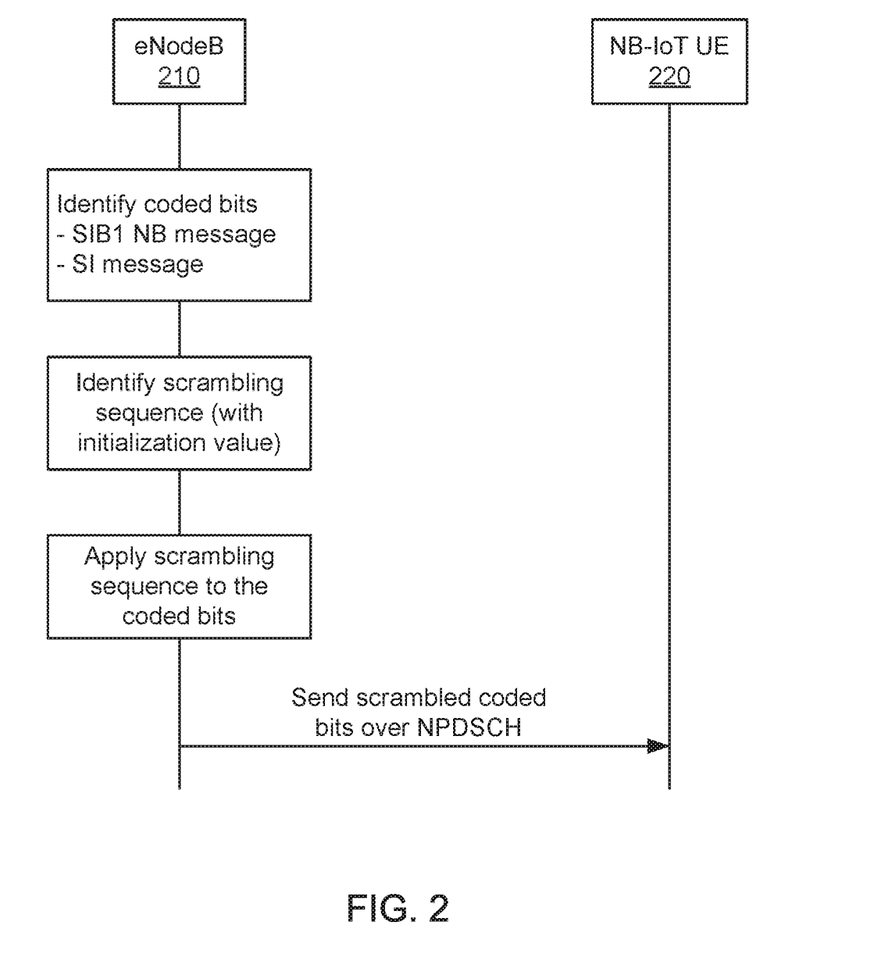
FIG. 2 illustrates signaling between an eNodeB and a user equipment (UE) via a narrow band physical downlink shared channel (NPDSCH) in accordance with an example.

FIG. 2 illustrates exemplary signaling between an eNodeB 210 and a narrowband Internet of Things (NB-IoT) user equipment (UE) 220 via a narrowband physical downlink shared channel (NPDSCH). As shown in FIG. 2, the eNodeB 210 can apply scrambling initializations to coded bits transported via the NPDSCH to the NB-IoT UE 220. The eNodeB 210 can identify coded bits for transmission to the NB-IoT UE 120. The coded bits can form one of a system information block type 1 (SIB1) narrowband (NB) or a type of system information (SI) message other than a SIB1 NB. The eNodeB 210 can identify a scrambling sequence to be applied to the coded bits. The scrambling sequence can be based on a pseudorandom sequence that is initialized using a defined initialization value ($c_{init}$). The eNodeB 210 can apply the scrambling sequence with the defined initialization value to the coded bits. Finally, the eNodeB 210 can transmit scrambled coded bits to the NB-IoT UE 220 via the NPDSCH.

In one example, for each codeword q, a block of bits $b^{(q)}(0), \ldots, b^{(q)}(M_{bit}^{(q)}-1)$, where $M_{bit}^{(q)}$ is a number of bits in codeword q transmitted on a physical channel in one subframe, can be scrambled prior to modulation, which can produce a block of scrambled bits $\tilde{b}^{(q)}(0), \ldots, \tilde{b}^{(q)}(M_{bit}^{(q)}-1)$ according to $\tilde{b}^{(q)}(i)=(b^{(q)}(i)+c^{(q)}(i)) \bmod 2$, where $c^{(q)}(i)$ is a defined scrambling sequence. A scrambling sequence generator can be initialized with an initialization value ($c_{init}$), which can be defined as $c_{init}=n_{RNTI} \cdot 2^{14}+n_f \bmod 2 \cdot 2^{13}+\lfloor n_s/2 \rfloor \cdot 2^9+n_{ID}^{cell}$ where $n_{RNTI}$ corresponds to a radio network temporary identifier (RNTI) associated with the NPDSCH transmission, $n_s$ is a first slot of the transmission of the codeword, $n_f$ is a first frame of the transmission of the codeword, and $N_{ID}^{cell}$ represents a cell identifier (ID). In the case of NPDSCH repetitions, the codeword can be scrambled again after every $\min(M_{rep}^{NPDSCH}, 4)$ transmissions with the scrambling sequence reinitialized in accordance with the above formula for the initialization value ($c_{init}$) and with $n_s$ and $n_f$ set to the first slot and the frame, respectively, used for the transmission of the repetition. Here, the frequency of the re-initialization can be determined by the value of min ($m_{rep}^{NPDSCH}$, 4), where $m_{rep}^{NPDSCH}$ is the number of repetitions of the NPDSCH transport block (TB), as indicated by the DCI.

When the NPDSCH is carrying a SIB1-BR or other SI messages, the determination of the scrambling initialization can be performed as follows.

With respect to when the NPDSCH carries a SIB1-BR for NB-IoT, since each transport block (TB) can be transmitted using 8 subframes that are separated by at least 20 ms for SIB1-NB (e.g., the TBs can be transmitted on subframe #4 of every other radio frame), the scrambling can be reinitialized every repetition of the entire codeword. In other words, the same scrambling may not be retained across repetitions of the SIB1-NB TB. Thus, in one example, for the NPDSCH carrying SIB1-NB, the scrambling can be reinitialized at the first subframe carrying a particular repetition of the codeword.

With respect to when the NPDSCH carries other types of system information (SI) message for NB-IoT, the resource mapping mechanism can be similar to that for eMTC, with the mapping of the NPDSCH TB to DL subframes following a mechanism similar to unicast NPDSCH. However, one difference is that the SI message TB can be mapped to consecutively available DL NB-IoT subframes. Another difference, as compared to eMTC, is the application of a pattern repetition (si-RepetitionPattern) and a downlink bitmap (downlinkBitmap). These two differences are explained in further detail below.

In one example, within an SI window (SI-window), a corresponding SI message can be transmitted a number of times over 8 consecutive valid downlink subframes. The UE can acquire time/frequency domain scheduling information and other information (e.g., used transport format for the SI messages) from a scheduling information list (schedulingInfoList) field in a SIB1-NB (SystemInformationBlock-Type1-NB). The UE may not accumulate several SI messages in parallel, but may accumulate a SI message across multiple SI windows, depending on coverage level.

In another example, when the UE is a NB-IoT UE, the UE can receive and accumulate SI message transmissions on a downlink shared channel (DL-SCH) from a start of the SI-window and continue until an end of the SI-window whose absolute length in time is given by a window length (si-WindowLength) in radio frames as provided in the repetition pattern (si-RepetitionPattern) and in subframes as provided in the downlink bitmap (downlinkBitmap), or until successful decoding of accumulated SI message transmissions excluding subframes that are used to transmit a narrowband primary synchronization signal (NPSS), narrowband secondary synchronization signal (NSSS), MasterInformationBlock-NB (MIB-NB), and SystemInformationBlockType1-NB (SIB1-NB).

In configuration, due to the mapping of a TB to a consecutive set of subframes, an application of repetition cycling as defined for unicast NPDSCH may not be advantageous. More specifically, maintaining the same scrambling sequence for repetitions of different subframes cannot be utilized, as gains from coherent symbol-level combining may not be realizable due to the impact from of a frequency offset between two subframes that are sufficiently separated in time. Therefore, for the NPDSCH carrying SI messages other than SIB1-NB, the scrambling can be reinitialized at the first subframe carrying a repetition of the codeword.

Alternatively, the resource mapping for SI messages can be defined to be similar to that for unicast NPDSCH, which can be scheduled by the NPDCCH with a CRC scrambled with a C-RNTI. In other words, the resource mapping for SI messages can be defined based on repetition cycles of length min ($M_{rep}^{NPDSCH-SI}$, 4). Further, the value of $m_{rep}^{NPDSCH-SI}$, which indicates the number of repetitions of the TB of the SI message, can be determined by $M_{rep}^{NPDSCH-SI}$=floor (numDlSubframesInSIWindow/numSubframesTB), where numDlSubframesInSIWindow is the number of used DL NB-IoT subframes within the SI window (as determined based on the si-RepetitionPattern and downlinkBitmap information), and numSubframesTB is the number of subframes mapped to the TB for the SI message.

For both cases when the NPDSCH is carrying the SIB1-BR or other SI messages, the $n_{RNTI}$ used in the scrambling initialization can be set to a system information radio network temporary identifier (SI-RNTI), although the NPDSCH may not be dynamically scheduled using NPDCCH carrying downlink control information (DCI) with a cyclic redundancy check (CRC) scrambled with the SI-RNTI. Alternatively, the $n_{RNTI}$ value can be fixed to a specified number.

Figure 3:
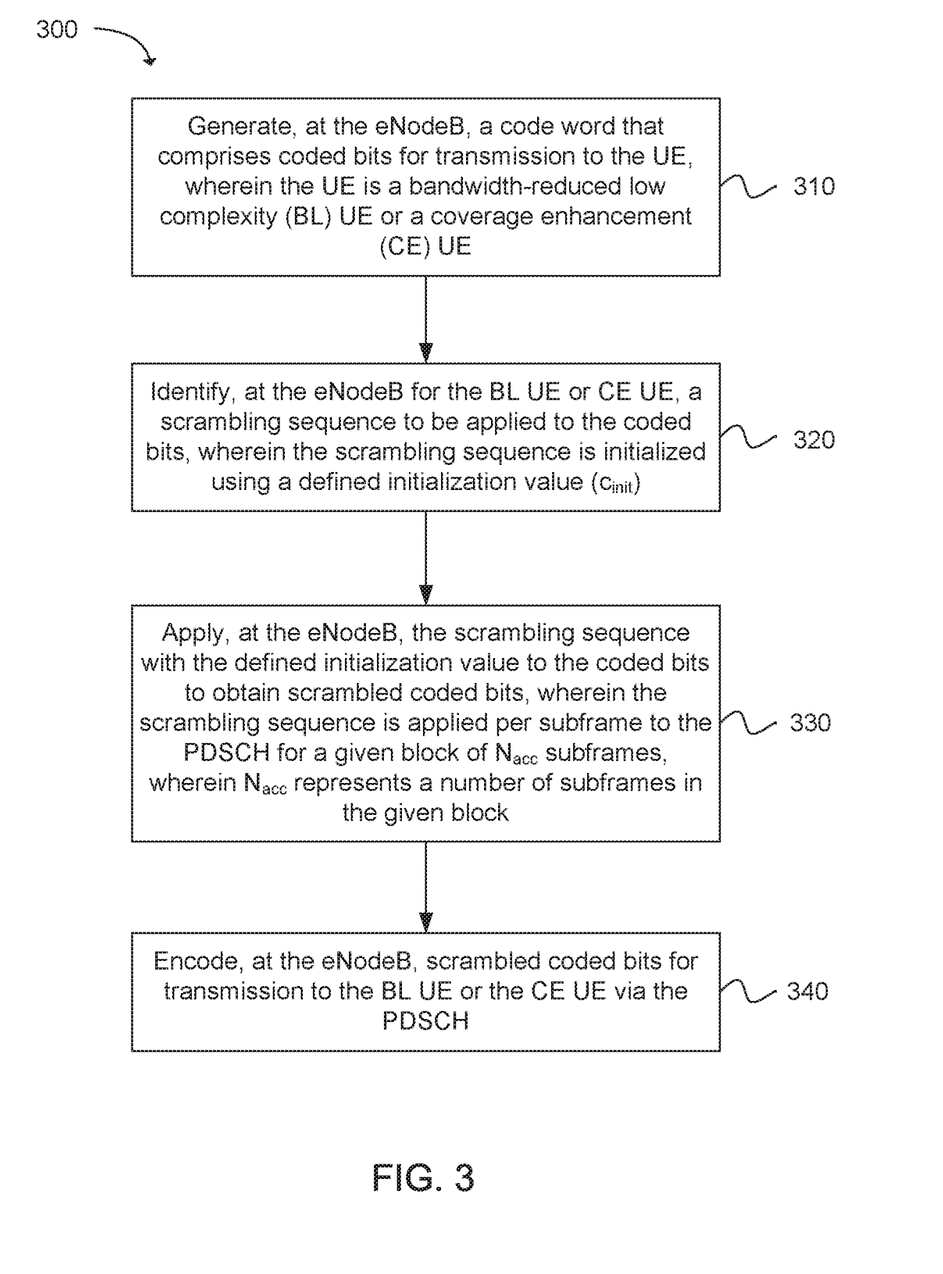
FIG. 3 depicts functionality of an eNodeB operable to apply scrambling initializations to coded bits transported via a physical downlink shared channel (PDSCH) to a user equipment (UE) in accordance with an example.

Another example provides functionality 300 of an eNodeB operable to apply scrambling initializations for coded bits transported via a narrowband physical downlink shared channel (NPDSCH) to a user equipment (UE), as shown in FIG. 3. The eNodeB can comprise one or more processors configured to: generate, at the eNodeB, a code word that comprises coded bits for transmission to the UE, wherein the UE includes a narrowband Internet of Things (NB-IoT) UE, as in block 310. The eNodeB can comprise one or more processors configured to: identify, at the eNodeB, a scrambling sequence to be applied to the coded bits, wherein the scrambling sequence is initialized using a defined initialization value ($c_{init}$), as in block 320. The eNodeB can comprise one or more processors configured to: apply, at the eNodeB, the scrambling sequence with the defined initialization value to the coded bits to obtain scrambled coded bits, wherein the scrambling sequence is applied per subframe to the PDSCH for a given block of $N_{acc}$ subframes, wherein $N_{acc}$ represents a number of subframes in the given block, as in block 330. The eNodeB can comprise one or more processors configured to: encode, at the eNodeB, the scrambled coded bits for transmission to the UE via the NPDSCH, wherein: $N_{acc}$ is set to 1 when the scrambled coded bits to be transmitted via the PDSCH form a system information block type 1 (SIB1) bandwidth reduced (BR); or $N_{acc}$ is set to 4 for a frame structure type 1 or $N_{acc}$ is set to 10 for a frame structure type 2, and the scrambled coded bits to be transmitted via the PDSCH form a type of system information (SI) message other than a system information block type 1 (SIB1) bandwidth reduced (BR); or $N_{acc}$ is set to 4 for a frame structure type 1 or $N_{acc}$ is set to 10 for a frame structure type 2, and the scrambled coded bits to be transmitted via the PDSCH form a paging message, as in block 340.

Figure 4:
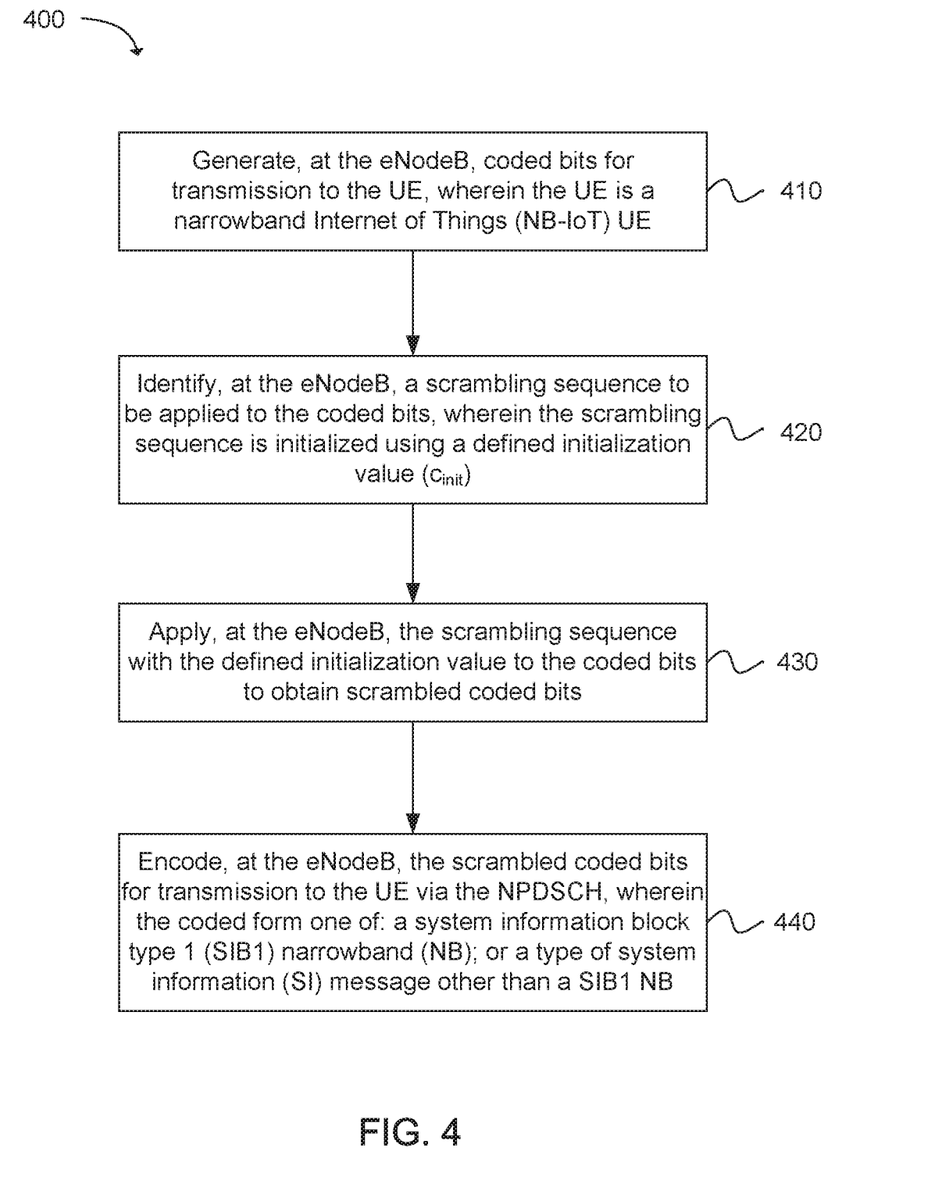
FIG. 4 depicts functionality of an eNodeB operable to apply scrambling initializations for coded bits transported via a narrowband physical downlink shared channel (NPDSCH) to a user equipment (UE) in accordance with an example.

Another example provides functionality 400 of an eNodeB operable to apply scrambling initializations to coded bits transported via a physical downlink shared channel (PDSCH) to a user equipment (UE), as shown in FIG. 4. The eNodeB can comprise one or more processors configured to: generate, at the eNodeB, coded bits for transmission to the UE, wherein the UE is a narrowband Internet of Things (NB-IoT) UE, as in block 410. The eNodeB can comprise one or more processors configured to: identify, at the eNodeB, a scrambling sequence to be applied to the coded bits, wherein the scrambling sequence is initialized using a defined initialization value ($c_{init}$), as in block 420. The eNodeB can comprise one or more processors configured to: apply, at the eNodeB, the scrambling sequence with the defined initialization value to the coded bits to obtain scrambled coded bits, as in block 430. The eNodeB can comprise one or more processors configured to: encode, at the eNodeB, the scrambled coded bits for transmission to the UE via the NPDSCH, wherein the coded bits form one of: a system information block type 1 (SIB1) narrowband (NB); or a type of system information (SI) message other than a SIB1 NB, as in block 440.

Figure 5:
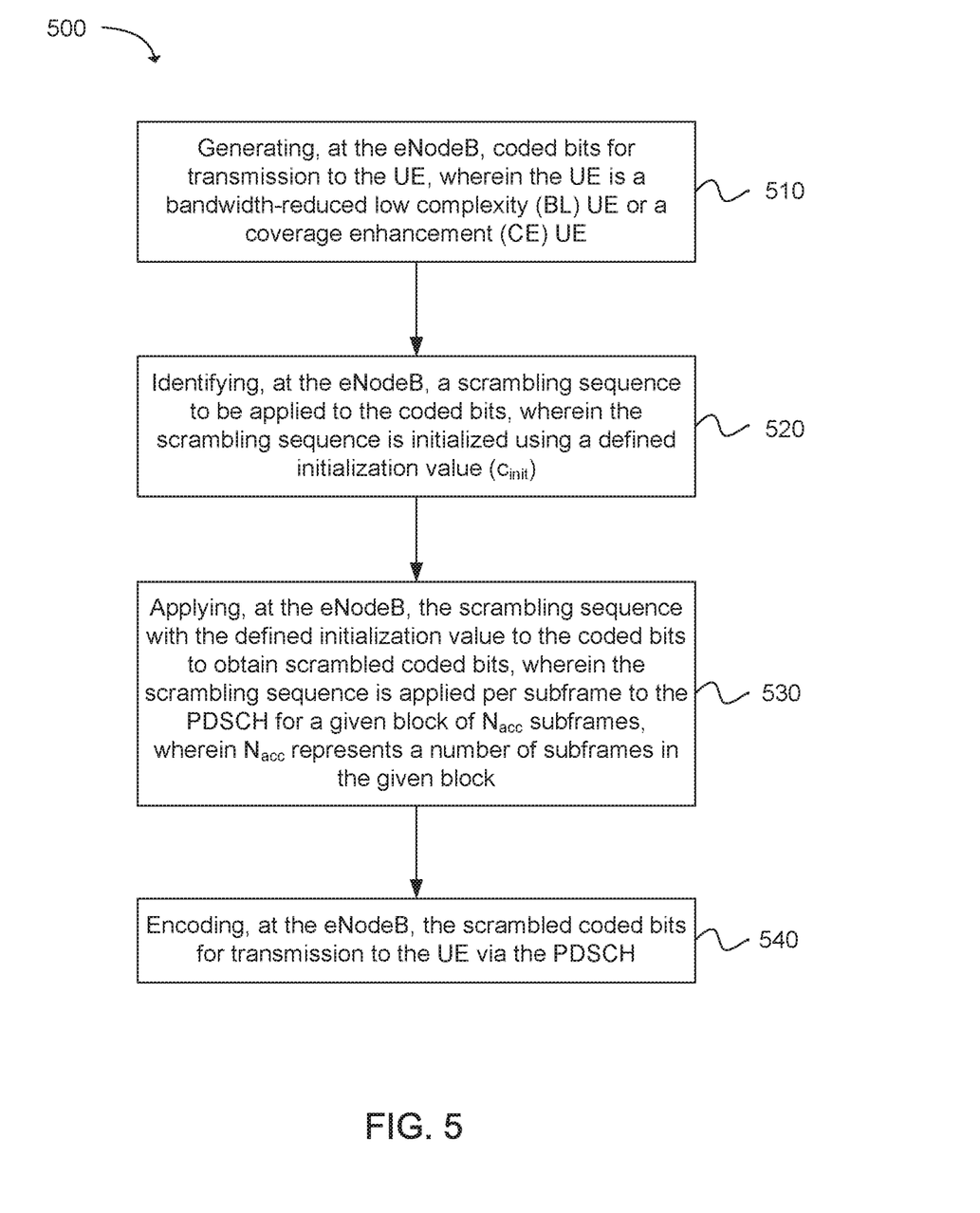
FIG. 5 depicts a flowchart of a machine readable storage medium having instructions embodied thereon for applying scrambling initializations to coded bits transported via a physical downlink shared channel (PDSCH) from an eNodeB to a user equipment (UE) in accordance with an example.

Another example provides at least one machine readable storage medium having instructions 500 embodied thereon for applying scrambling initializations to coded bits transported via a physical downlink shared channel (PDSCH) from an eNodeB to a user equipment (UE), as shown in FIG. 5. The instructions can be executed on a machine, where the instructions are included on at least one computer readable medium or one non-transitory machine readable storage medium. The instructions when executed perform: generating, using one or more processors at the eNodeB, coded bits for transmission to the UE, wherein the UE includes a bandwidth-reduced low complexity (BL) UE or a coverage enhancement (CE) UE, as in block 510. The instructions when executed perform: identifying, using the one or more processors at the eNodeB, a scrambling sequence to be applied to the coded bits, wherein the scrambling sequence is initialized using a defined initialization value ($c_{init}$), as in block 520. The instructions when executed perform: applying, using the one or more processors at the eNodeB, at the eNodeB, the scrambling sequence with the defined initialization value to the coded bits to obtain scrambled coded bits, wherein the scrambling sequence is applied per subframe to the PDSCH for a given block of $N_{acc}$ subframes, wherein $N_{acc}$ represents a number of subframes in the given block, as in block 530. The instructions when executed perform: encoding, using the one or more processors at the eNodeB, at the eNodeB, scrambled coded bits for transmission to the UE via the PDSCH, wherein: $N_{acc}$ is set to 1 when the scrambled coded bits to be transmitted via the PDSCH form a system information block type 1 (SIB1) bandwidth reduced (BR); or $N_{acc}$ is set to 4 for a frame structure type 1 or $N_{acc}$ is set to 10 for a frame structure type 2, and the scrambled coded bits to be transmitted via the PDSCH form a type of system information (SI) message other than a system information block type 1 (SIB1) bandwidth reduced (BR); or $N_{acc}$ is set to 4 for a frame structure type 1 or $N_{acc}$ is set to 10 for a frame structure type 2, and the scrambled coded bits to be transmitted via the PDSCH form a paging message, as in block 540.

Figure 6:
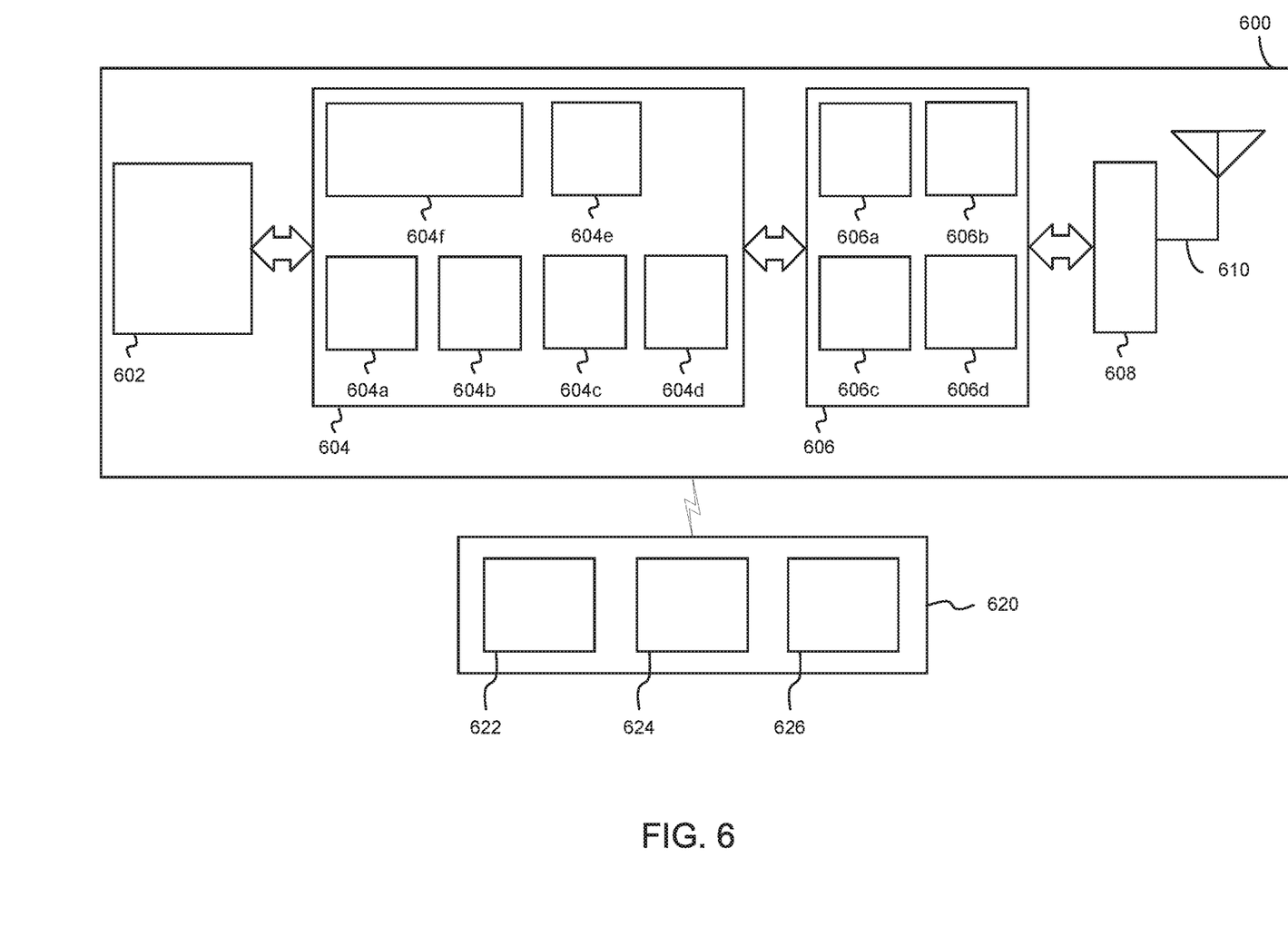
FIG. 6 illustrates a diagram of a wireless device (e.g., UE) and a base station (e.g., eNodeB) in accordance with an example.

FIG. 6 provides an example illustration of a user equipment (UE) device 600 and a node 620. The UE device 600 can include a wireless device, a mobile station (MS), a mobile wireless device, a mobile communication device, a tablet, a handset, or other type of wireless device. The UE device 600 can include one or more antennas configured to communicate with the node 620 or transmission station, such as a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The node 620 can include one or more processors 622, memory 624 and a transceiver 626. The UE device 600 can be configured to communicate using at least one wireless communication standard including 3GPP LTE, WiMAX, High Speed Packet Access (HSPA), Bluetooth, and WiFi. The UE device 600 can communicate using separate antennas for each wireless communication standard or shared antennas for multiple wireless communication standards. The UE device 600 can communicate in a wireless local area network (WLAN), a wireless personal area network (WPAN), and/or a WWAN.

In some embodiments, the UE device 600 may include application circuitry 602, baseband circuitry 604, Radio Frequency (RF) circuitry 606, front-end module (FEM) circuitry 608 and one or more antennas 610, coupled together at least as shown. In addition, the node 620 may include, similar to that described for the UE device 600, application circuitry, baseband circuitry, Radio Frequency (RF) circuitry, front-end module (FEM) circuitry and one or more antennas.

The application circuitry 602 may include one or more application processors. For example, the application circuitry 602 may include circuitry such as, but not limited to, one or more single-core or multi-core processors. The processor(s) may include any combination of general-purpose processors and dedicated processors (e.g., graphics processors, application processors, etc.). The processors may be coupled with and/or may include a storage medium, and may be configured to execute instructions stored in the storage medium to enable various applications and/or operating systems to run on the system.

The baseband circuitry 604 may include circuitry such as, but not limited to, one or more single-core or multi-core processors. The baseband circuitry 604 may include one or more baseband processors and/or control logic to process baseband signals received from a receive signal path of the RF circuitry 606 and to generate baseband signals for a transmit signal path of the RF circuitry 606. Baseband processing circuitry 604 may interface with the application circuitry 602 for generation and processing of the baseband signals and for controlling operations of the RF circuitry 606. For example, in some embodiments, the baseband circuitry 604 may include a second generation (2G) baseband processor 604a, third generation (3G) baseband processor 604b, fourth generation (4G) baseband processor 604c, and/or other baseband processor(s) 604d for other existing generations, generations in development or to be developed in the future (e.g., fifth generation (5G), 6G, etc.). The baseband circuitry 604 (e.g., one or more of baseband processors 604a-d) may handle various radio control functions that enable communication with one or more radio networks via the RF circuitry 606. The radio control functions may include, but are not limited to, signal modulation/demodulation, encoding/decoding, radio frequency shifting, etc. In some embodiments, modulation/demodulation circuitry of the baseband circuitry 604 may include Fast-Fourier Transform (FFT), precoding, and/or constellation mapping/demapping functionality. In some embodiments, encoding/decoding circuitry of the baseband circuitry 604 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 604 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 604e of the baseband circuitry 604 may be configured to run elements of the protocol stack for signaling of the PHY, MAC, RLC, PDCP and/or RRC layers. In some embodiments, the baseband circuitry may include one or more audio digital signal processor(s) (DSP) 604f. The audio DSP(s) 104f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 604 and the application circuitry 602 may be implemented together such as, for example, on a system on a chip (SOC).

In some embodiments, the baseband circuitry 604 may provide for communication compatible with one or more radio technologies. For example, in some embodiments, the baseband circuitry 604 may support communication with an evolved universal terrestrial radio access network (EU-TRAN) and/or other wireless metropolitan area networks (WMAN), a wireless local area network (WLAN), a wireless personal area network (WPAN). Embodiments in which the baseband circuitry 604 is configured to support radio communications of more than one wireless protocol may be referred to as multi-mode baseband circuitry.

The RF circuitry 606 may enable communication with wireless networks using modulated electromagnetic radiation through a non-solid medium. In various embodiments, the RF circuitry 606 may include switches, filters, amplifiers, etc. to facilitate the communication with the wireless network. RF circuitry 606 may include a receive signal path which may include circuitry to down-convert RF signals received from the FEM circuitry 608 and provide baseband signals to the baseband circuitry 604. RF circuitry 606 may also include a transmit signal path which may include circuitry to up-convert baseband signals provided by the baseband circuitry 604 and provide RF output signals to the FEM circuitry 608 for transmission.

In some embodiments, the RF circuitry 606 may include a receive signal path and a transmit signal path. The receive signal path of the RF circuitry 606 may include mixer circuitry 606a, amplifier circuitry 606b and filter circuitry 606c. The transmit signal path of the RF circuitry 606 may include filter circuitry 606c and mixer circuitry 606a. RF circuitry 606 may also include synthesizer circuitry 606d for synthesizing a frequency for use by the mixer circuitry 606a of the receive signal path and the transmit signal path. In some embodiments, the mixer circuitry 606a of the receive signal path may be configured to down-convert RF signals received from the FEM circuitry 608 based on the synthesized frequency provided by synthesizer circuitry 606d. The amplifier circuitry 606b may be configured to amplify the down-converted signals and the filter circuitry 606c may be a low-pass filter (LPF) or band-pass filter (BPF) configured to remove unwanted signals from the down-converted signals to generate output baseband signals. Output baseband signals may be provided to the baseband circuitry 604 for further processing. In some embodiments, the output baseband signals may be zero-frequency baseband signals, although this is not a necessity. In some embodiments, mixer circuitry 606a of the receive signal path may comprise passive mixers, although the scope of the embodiments is not limited in this respect.

In some embodiments, the mixer circuitry 606a of the transmit signal path may be configured to up-convert input baseband signals based on the synthesized frequency provided by the synthesizer circuitry 606d to generate RF output signals for the FEM circuitry 608. The baseband signals may be provided by the baseband circuitry 604 and may be filtered by filter circuitry 606c. The filter circuitry 606c may include a low-pass filter (LPF), although the scope of the embodiments is not limited in this respect.

In some embodiments, the mixer circuitry 606a of the receive signal path and the mixer circuitry 606a of the transmit signal path may include two or more mixers and may be arranged for quadrature down-conversion and/or up-conversion respectively. In some embodiments, the mixer circuitry 606a of the receive signal path and the mixer circuitry 606a of the transmit signal path may include two or more mixers and may be arranged for image rejection (e.g., Hartley image rejection). In some embodiments, the mixer circuitry 606a of the receive signal path and the mixer circuitry 606a may be arranged for direct down-conversion and/or direct up-conversion, respectively. In some embodiments, the mixer circuitry 606a of the receive signal path and the mixer circuitry 606a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 606 may include analog-to-digital converter (ADC) and digital-to-analog converter (DAC) circuitry and the baseband circuitry 604 may include a digital baseband interface to communicate with the RF circuitry 606.

In some dual-mode embodiments, a separate radio IC circuitry may be provided for processing signals for each spectrum, although the scope of the embodiments is not limited in this respect.

In some embodiments, the synthesizer circuitry 606d may be a fractional-N synthesizer or a fractional N/N+1 synthesizer, although the scope of the embodiments is not limited in this respect as other types of frequency synthesizers may be suitable. For example, synthesizer circuitry 606d may be a delta-sigma synthesizer, a frequency multiplier, or a synthesizer comprising a phase-locked loop with a frequency divider.

The synthesizer circuitry 606d may be configured to synthesize an output frequency for use by the mixer circuitry 606a of the RF circuitry 606 based on a frequency input and a divider control input. In some embodiments, the synthesizer circuitry 606d may be a fractional N/N+1 synthesizer.

In some embodiments, frequency input may be provided by a voltage controlled oscillator (VCO), although that is not a necessity. Divider control input may be provided by either the baseband circuitry 604 or the applications processor 602 depending on the desired output frequency. In some embodiments, a divider control input (e.g., N) may be determined from a look-up table based on a channel indicated by the applications processor 602.

Synthesizer circuitry 606d of the RF circuitry 606 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 606d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 606 may include an IQ/polar converter.

FEM circuitry 608 may include a receive signal path which may include circuitry configured to operate on RF signals received from one or more antennas 610, amplify the received signals and provide the amplified versions of the received signals to the RF circuitry 606 for further processing. FEM circuitry 608 may also include a transmit signal path which may include circuitry configured to amplify signals for transmission provided by the RF circuitry 606 for transmission by one or more of the one or more antennas 610.

In some embodiments, the FEM circuitry 608 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 606). The transmit signal path of the FEM circuitry 608 may include a power amplifier (PA) to amplify input RF signals (e.g., provided by RF circuitry 606), and one or more filters to generate RF signals for subsequent transmission (e.g., by one or more of the one or more antennas 610.

Figure 7:
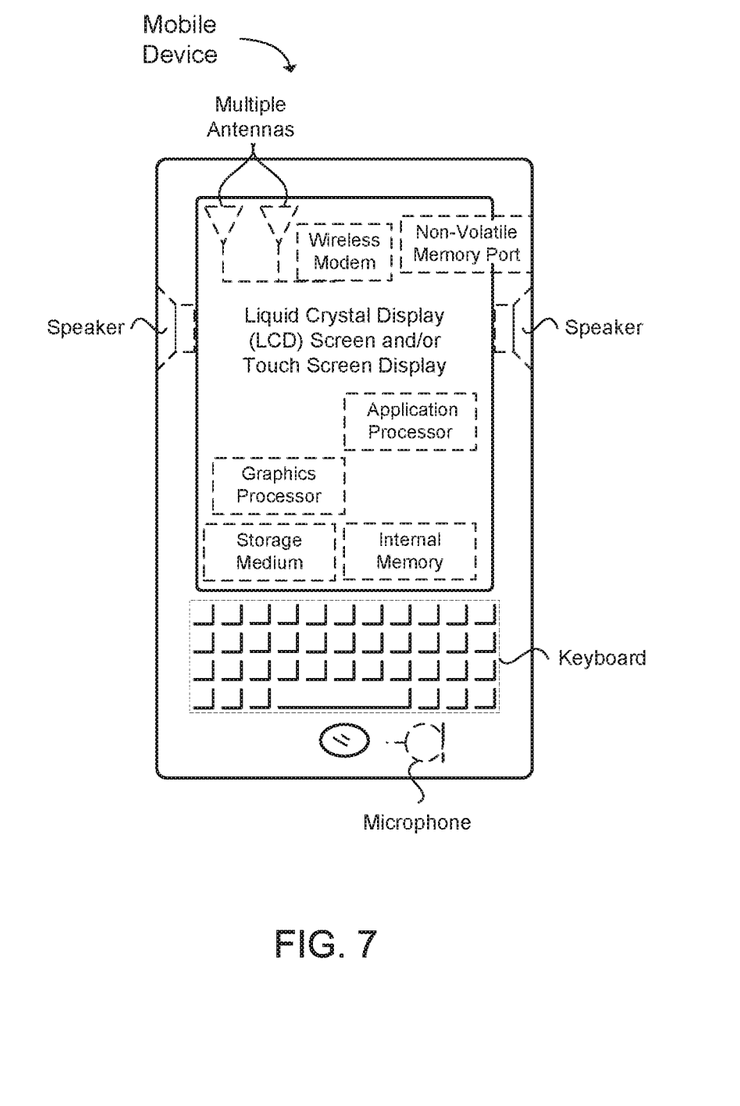
FIG. 7 illustrates a diagram of a wireless device (e.g., UE) in accordance with an example.

FIG. 7 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a baseband processing unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard such as, but not limited to, 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN. The wireless device can also comprise a wireless modem. The wireless modem can comprise, for example, a wireless radio transceiver and baseband circuitry (e.g., a baseband processor). The wireless modem can, in one example, modulate signals that the wireless device transmits via the one or more antennas and demodulate signals that the wireless device receives via the one or more antennas.

FIG. 7 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be integrated with the wireless device or wirelessly connected to the wireless device to provide additional user input. A virtual keyboard can also be provided using the touch screen.

Examples

The following examples pertain to specific technology embodiments and point out specific features, elements, or actions that can be used or otherwise combined in achieving such embodiments.

Example 1 includes an apparatus of an eNodeB operable to apply scrambling to coded bits transported via a physical downlink shared channel (PDSCH) to a user equipment (UE), the eNodeB comprising one or more processors configured to: generate, at the eNodeB, a code word that comprises coded bits for transmission to the UE, wherein the UE is a bandwidth-reduced low complexity (BL) UE or a coverage enhancement (CE) UE; identify, at the eNodeB for the BL UE or the CE UE, a scrambling sequence to be applied to the coded bits, wherein the scrambling sequence is initialized using a defined initialization value ($c_{init}$); apply, at the eNodeB, the scrambling sequence with the defined initialization value to the coded bits to obtain scrambled coded bits, wherein the scrambling sequence is applied per subframe to the PDSCH for a given block of $N_{acc}$ subframes, wherein $N_{acc}$ represents a number of subframes in the given block; and encode, at the eNodeB, the scrambled coded bits for transmission to the UE via the PDSCH, wherein: $N_{acc}$ is set to 1 when the scrambled coded bits to be transmitted via the PDSCH form a system information block type 1 (SIB1) bandwidth reduced (BR); or $N_{acc}$ is set to 4 for a frame structure type 1 or $N_{acc}$ is set to 10 for a frame structure type 2, and the scrambled coded bits to be transmitted via the PDSCH form a type of system information (SI) message other than a system information block type 1 (SIB1) bandwidth reduced (BR); or $N_{acc}$ is set to 4 for a frame structure type 1 or $N_{acc}$ is set to 10 for a frame structure type 2, and the scrambled coded bits to be transmitted via the PDSCH form a paging message.

Example 2 includes the apparatus of Example 1, further comprising a transceiver configured to transmit the scrambled coded bits to the UE.

Example 3 includes the apparatus of any of Examples 1 to 2, further comprising memory configured to store the scrambled coded bits for transmission to the UE via the PDSCH.

Example 4 includes the apparatus of any of Examples 1 to 3, wherein the one or more processors are further configured to apply a same scrambling sequence per subframe to the PDSCH for the given block of $N_{acc}$ subframes.

Example 5 includes the apparatus of any of Examples 1 to 4, wherein the one or more processors are further configured to initialize the scrambling sequence for a $j^{th}$ block of the $N_{acc}$ subframes using the defined initialization value ($c_{init}$), wherein $c_{init} = n_{RNTI} \cdot 2^{14} + q \cdot 2^{13} + [(j_0+j)N_{acc} \mod 10] \cdot 2^9 + N_{ID}^{cell}$, wherein $n_{RNTI}$ represents a radio network temporary identifier, q represents a given codeword, $j_0$ represents a first block in the $N_{acc}$ subframes, j represents a given block in the $N_{acc}$ subframes, and $N_{ID}^{cell}$ represents a cell identifier (ID).

Example 6 includes the apparatus of any of Examples 1 to 5, wherein:

$$j = 0, 1, \ldots, \left\lfloor \frac{i_0 + N_{abs}^{PDSCH} + i_\Delta - 1}{N_{acc}} \right\rfloor - j_0$$

$$j_0 = \lfloor (i_0 + i_\Delta)/N_{acc} \rfloor$$

$$i_\Delta = \begin{cases} 0, & \text{for frame structure type 1} \\ N_{acc} - 2, & \text{for frame structure type 2} \end{cases},$$

wherein $N_{abs}^{PDSCH}$ represents a total number of absolute subframes spanned by a PDSCH with repetition, $i_0$ represents an absolute subframe number of a first downlink subframe intended for the PDSCH, and $i_\Delta$ represents a change in the absolute subframe number.

Example 7 includes the apparatus of any of Examples 1 to 6, wherein the $n_{RNTI}$ is set to a system information radio network temporary identifier (SI-RNTI) when the scrambled coded bits form the SIB1 or the type of SI message other than the SIB1 BR.

Example 8 includes an apparatus of an eNodeB operable to apply scrambling for coded bits transported via a narrowband physical downlink shared channel (NPDSCH) to a user equipment (UE), the eNodeB comprising one or more processors configured to: generate, at the eNodeB, coded bits for transmission to the UE, wherein the UE is a narrowband Internet of Things (NB-IoT) UE; identify, at the eNodeB, a scrambling sequence to be applied to the coded bits, wherein the scrambling sequence is initialized using a defined initialization value ($c_{init}$); apply, at the eNodeB, the scrambling sequence with the defined initialization value to the coded bits to obtain scrambled coded bits; and encode, at the eNodeB, the scrambled coded bits for transmission to the UE via the NPDSCH, wherein the coded bits form one of: a system information block type 1 (SIB1) narrowband (NB); or a type of system information (SI) message other than a SIB1 NB.

Example 9 includes the apparatus of Example 8, wherein the one or more processors are further configured to apply a same scrambling sequence per subframe to the NPDSCH for a given block of $N_{acc}$ subframes, wherein $N_{acc}$ represents a number of subframes in the given block.

Example 10 includes the apparatus of any of Examples 8 to 9, wherein the one or more processors are further configured to initialize the scrambling sequence for a $j^{th}$ block of the $N_{acc}$ subframes using the defined initialization value ($c_{init}$), wherein $c_{init} = n_{RNTI} \cdot 2^{14} + q \cdot 2^{13} + [(j_0+j)N_{acc} \mod 10] \cdot 2^9 + N_{ID}^{cell}$, wherein $n_{RNTI}$ represents a radio network temporary identifier, q represents a given codeword, $j_0$ represents a first block in the $N_{acc}$ subframes, j represents a given block in the $N_{acc}$ subframes, and $N_{ID}^{cell}$ represents a cell identifier (ID).

Example 11 includes the apparatus of any of Examples 8 to 10, wherein:

$$j = 0, 1, \ldots, \left\lfloor \frac{i_0 + N_{abs}^{PDSCH} + i_\Delta - 1}{N_{acc}} \right\rfloor - j_0$$

$$j_0 = \lfloor (i_0 + i_\Delta)/N_{acc} \rfloor$$

$$i_\Delta = \begin{cases} 0, & \text{for frame structure type 1} \\ N_{acc} - 2, & \text{for frame structure type 2} \end{cases},$$

wherein $N_{abs}^{PDSCH}$ represents a total number of absolute subframes spanned by an NPDSCH with repetition, $i_0$ represents an absolute subframe number of a first downlink subframe intended for the NPDSCH, and $i_\Delta$ represents a change in the absolute subframe number.

Example 12 includes the apparatus of any of Examples 8 to 11, wherein the one or more processors are further configured to reinitialize the scrambling sequence at a first subframe carrying a repetition of a codeword formed by the scrambled coded bits, wherein the scrambling sequence is reinitialized at the first subframe when the scrambled coded bits form the SIB1 NB.

Example 13 includes the apparatus of any of Examples 8 to 12, wherein the one or more processors are further configured to reinitialize the scrambling sequence at a first subframe carrying a repetition of a codeword formed by the scrambled coded bits, wherein the scrambling sequence is reinitialized at the first subframe when the scrambled coded bits form the type of SI message other than the SIB1 NB.

Example 14 includes the apparatus of any of Examples 8 to 13, wherein the $n_{RNTI}$ is set to a system information radio network temporary identifier (SI-RNTI) or the $n_{RNTI}$ is fixed to a defined value when the scrambled coded bits form the SIB1 NB or the type of SI message other than the SIB1 NB.

Example 15 includes at least one machine readable storage medium having instructions embodied thereon for applying scrambling to coded bits transported via a physical downlink shared channel (PDSCH) from an eNodeB to a user equipment (UE), the instructions when executed using one or more processors perform the following: generating, at the eNodeB, coded bits for transmission to the UE, wherein the UE is a bandwidth-reduced low complexity (BL) UE or a coverage enhancement (CE) UE; identifying, at the eNodeB, a scrambling sequence to be applied to the coded bits, wherein the scrambling sequence is initialized using a defined initialization value ($c_{init}$); applying, at the eNodeB, at the eNodeB, the scrambling sequence with the defined initialization value to the coded bits to obtain scrambled coded bits, wherein the scrambling sequence is applied per subframe to the PDSCH for a given block of $N_{acc}$ subframes, wherein $N_{acc}$ represents a number of subframes in the given block; and encoding, at the eNodeB, at the eNodeB, the scrambled coded bits for transmission to the UE via the PDSCH, wherein: $N_{acc}$ is set to 1 when the scrambled coded bits to be transmitted via the PDSCH form a system information block type 1 (SIB1) bandwidth reduced (BR); or $N_{acc}$ is set to 4 for a frame structure type 1 or $N_{acc}$ is set to 10 for a frame structure type 2, and the scrambled coded bits to be transmitted via the PDSCH form a type of system information (SI) message other than a system information block type 1 (SIB1) bandwidth reduced (BR); or $N_{acc}$ is set to 4 for a frame structure type 1 or $N_{acc}$ is set to 10 for a frame structure type 2, and the scrambled coded bits to be transmitted via the PDSCH form a paging message.

Example 16 includes the at least one machine readable storage medium of Example 15, further comprising instructions when executed perform the following: applying a same scrambling sequence per subframe to the PDSCH for the given block of $N_{acc}$ subframes.

Example 17 includes the at least one machine readable storage medium of any of Examples 15 to 16, further comprising instructions when executed perform the following: initializing the scrambling sequence for a $j^{th}$ block of the $N_{acc}$ subframes using the defined initialization value ($c_{init}$), wherein $c_{init} = n_{RNTI} \cdot 2^{14} + q \cdot 2^{13} + [(j_0+j)N_{acc} \mod 10] \cdot 2^9 + N_{ID}^{cell}$, wherein $n_{RNTI}$ represents a radio network temporary identifier, q represents a given codeword, $j_0$ represents a first block in the $N_{acc}$ subframes, j represents a given block in the $N_{acc}$ subframes, and $N_{ID}^{cell}$ represents a cell identifier (ID).

Example 18 includes the at least one machine readable storage medium of any of Examples 15 to 17, wherein:

$$j = 0, 1, \ldots, \left\lfloor \frac{i_0 + N_{abs}^{PDSCH} + i_\Delta - 1}{N_{acc}} \right\rfloor - j_0$$

$$j_0 = \lfloor (i_0 + i_\Delta)/N_{acc} \rfloor$$

$$i_\Delta = \begin{cases} 0, & \text{for frame structure type 1} \\ N_{acc} - 2, & \text{for frame structure type 2} \end{cases},$$

wherein $N_{abs}^{PDSCH}$ represents a total number of absolute subframes spanned by a PDSCH with repetition, $i_0$ represents an absolute subframe number of a first downlink subframe intended for the PDSCH, and $i_\Delta$ represents a change in the absolute subframe number.

Example 19 includes the at least one machine readable storage medium of any of Examples 15 to 18, wherein the $n_{RNTI}$ is set to a system information radio network temporary identifier (SI-RNTI) when the scrambled coded bits form the SIB1 or the type of SI message other than the SIB1 BR.

Example 20 includes the at least one machine readable storage medium of any of Examples 15 to 19, wherein the coded bits generated at the eNodeB form a code word.

Example 21 includes an eNodeB operable to apply scrambling to coded bits transported via a physical downlink shared channel (PDSCH) to a user equipment (UE), the eNodeB comprising: means for generating coded bits for transmission to the UE, wherein the UE is a bandwidth-reduced low complexity (BL) UE or a coverage enhancement (CE) UE; means for identifying a scrambling sequence to be applied to the coded bits, wherein the scrambling sequence is initialized using a defined initialization value ($c_{init}$); means for applying the scrambling sequence with the defined initialization value to the coded bits to obtain scrambled coded bits, wherein the scrambling sequence is applied per subframe to the PDSCH for a given block of $N_{acc}$ subframes, wherein $N_{acc}$ represents a number of subframes in the given block; and means for encoding the scrambled coded bits for transmission to the UE via the PDSCH, wherein: $N_{acc}$ is set to 1 when the scrambled coded bits to be transmitted via the PDSCH form a system information block type 1 (SIB1) bandwidth reduced (BR); or $N_{acc}$ is set to 4 for a frame structure type 1 or $N_{acc}$ is set to 10 for a frame structure type 2, and the scrambled coded bits to be transmitted via the PDSCH form a type of system information (SI) message other than a system information block type 1 (SIB1) bandwidth reduced (BR); or $N_{acc}$ is set to 4 for a frame structure type 1 or $N_{acc}$ is set to 10 for a frame structure type 2, and the scrambled coded bits to be transmitted via the PDSCH form a paging message.

Example 22 includes the eNodeB of Example 21, further comprising means for applying a same scrambling sequence per subframe to the PDSCH for the given block of $N_{acc}$ subframes.

Example 23 includes the eNodeB of any of Examples 21 to 22, further comprising means for initializing the scrambling sequence for a $j^{th}$ block of the $N_{acc}$ subframes using the defined initialization value ($c_{init}$), wherein $c_{init} = n_{RNTI} \cdot 2^{14} + q \cdot 2^{13} + [(j_0+j)N_{acc} \mod 10] \cdot 2^9 + N_{ID}^{cell}$, wherein $n_{RNTI}$ represents a radio network temporary identifier, q represents a given codeword, $j_0$ represents a first block in the $N_{acc}$ subframes, j represents a given block in the $N_{acc}$ subframes, and $N_{ID}^{cell}$ represents a cell identifier (ID).

Example 24 includes the eNodeB of any of Examples 21 to 23, wherein:

$$j = 0, 1, \ldots, \left\lfloor \frac{i_0 + N_{abs}^{PDSCH} + i_\Delta - 1}{N_{acc}} \right\rfloor - j_0$$

$$j_0 = \lfloor (i_0 + i_\Delta)/N_{acc} \rfloor$$

$$i_\Delta = \begin{cases} 0, & \text{for frame structure type 1} \\ N_{acc} - 2, & \text{for frame structure type 2} \end{cases},$$

wherein $N_{abs}^{PDSCH}$ represents a total number of absolute subframes spanned by a PDSCH with repetition, $i_0$ represents an absolute subframe number of a first downlink subframe intended for the PDSCH, and $i_\Delta$ represents a change in the absolute subframe number.

Example 25 includes the eNodeB of any of Examples 21 to 24, wherein the $n_{RNTI}$ is set to a system information radio network temporary identifier (SI-RNTI) when the scrambled coded bits form the SIB1 or the type of SI message other than the SIB1 BR.

Example 26 includes the eNodeB of any of Examples 21 to 25, wherein the coded bits generated at the eNodeB form a code word.

Various techniques, or certain aspects or portions thereof, may take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). In one example, selected components of the transceiver module can be located in a cloud radio access network (C-RAN). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module may not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present technology. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present technology may be referred to herein along with alternatives for the various components thereof. It is understood that such embodiments, examples, and alternatives are not to be construed as defacto equivalents of one another, but are to be considered as separate and autonomous representations of the present technology.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the technology. One skilled in the relevant art will recognize, however, that the technology can be practiced without one or more of the specific details, or with other methods, components, layouts, etc. In other instances, well-known structures, materials, or operations are not shown or described in detail to avoid obscuring aspects of the technology.

While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology. Accordingly, it is not intended that the technology be limited, except as by the claims set forth below.

What is claimed is:

1. An apparatus of an eNodeB operable to apply scrambling to coded bits transported via a physical downlink shared channel (PDSCH) to a user equipment (UE), the eNodeB comprising one or more processors configured to:
   generate, at the eNodeB, a code word that comprises coded bits for transmission to the UE, wherein the UE is a bandwidth-reduced low complexity (BL) UE or a coverage enhancement (CE) UE;
   identify, at the eNodeB for the BL UE or the CE UE, a scrambling sequence to be applied to the coded bits, wherein the scrambling sequence is initialized using a defined initialization value ($c_{init}$);
   apply, at the eNodeB, the scrambling sequence with the defined initialization value to the coded bits to obtain scrambled coded bits, wherein the scrambling sequence is applied per subframe to the PDSCH for a given block of $N_{acc}$ subframes, wherein $N_{acc}$ represents a number of subframes in the given block; and
   encode, at the eNodeB, the scrambled coded bits for transmission to the UE via the PDSCH,
   wherein:
      $N_{acc}$ is set to 1 when the scrambled coded bits to be transmitted via the PDSCH form a system information block type 1 (SIB1) bandwidth reduced (BR);
      $N_{acc}$ is set to 4 for a frame structure type 1 and $N_{acc}$ is set to 10 for a frame structure type 2 when the scrambled coded bits to be transmitted via the PDSCH form a type of system information (SI) message other than a system information block type 1 (SIB1) bandwidth reduced (BR); and
      $N_{acc}$ is set to 4 for a frame structure type 1 and $N_{acc}$ is set to 10 for a frame structure type 2 when the scrambled coded bits to be transmitted via the PDSCH form a paging message.

2. The apparatus of claim 1, further comprising a transceiver configured to transmit the scrambled coded bits to the UE.

3. The apparatus of claim 1, further comprising memory configured to store the scrambled coded bits for transmission to the UE via the PDSCH.

4. The apparatus of claim 1, wherein the one or more processors are further configured to apply a same scrambling sequence per subframe to the PDSCH for the given block of $N_{acc}$ subframes.

5. The apparatus of claim 1, wherein the one or more processors are further configured to initialize the scrambling sequence for a $j^{th}$ block of the $N_{acc}$ subframes using the defined initialization value ($c_{init}$), wherein $c_{init}=n_{RNTI} \cdot 2^{14}+q \cdot 2^{13}+[(j_0+j)N_{acc} \mod 10] \cdot 2^9+N_{ID}^{cell}$, wherein $n_{RNTI}$ represents a radio network temporary identifier, q represents a given codeword, $j_0$ represents a first block in the $N_{acc}$ subframes, j represents a given block in the $N_{acc}$ subframes, and $N_{ID}^{CELL}$ represents a cell identifier (ID).

6. The apparatus of claim 5, wherein:

$$j = 0, 1, \ldots , \left\lfloor \frac{i_0 + N_{abs}^{PDSCH} + i_\Delta - 1}{N_{acc}} \right\rfloor - j_0$$

$$j_0 = \lfloor (i_0 + i_\Delta)/N_{acc} \rfloor$$

$$i_\Delta = \begin{cases} 0, & \text{for frame structure type 1} \\ N_{acc} - 2, & \text{for frame structure type 2} \end{cases},$$

wherein $N_{abs}^{PDSCH}$ represents a total number of absolute subframes spanned by a PDSCH with repetition, $i_0$ represents an absolute subframe number of a first downlink subframe intended for the PDSCH, and $i_\Delta$ represents a change in the absolute subframe number.

7. The apparatus of claim 5, wherein the $n_{RNTI}$ is set to a system information radio network temporary identifier (SI-RNTI) when the scrambled coded bits form the SIB1 or the type of SI message other than the SIB1 BR.

8. At least one non-transitory machine readable storage medium having instructions embodied thereon for applying scrambling to coded bits transported via a physical downlink shared channel (PDSCH) from an eNodeB to a user equipment (UE), the instructions when executed using one or more processors perform the following:
  generating, at the eNodeB, coded bits for transmission to the UE, wherein the UE is a bandwidth-reduced low complexity (BL) UE or a coverage enhancement (CE) UE;
  identifying, at the eNodeB, a scrambling sequence to be applied to the coded bits, wherein the scrambling sequence is initialized using a defined initialization value ($c_{init}$);
  applying, at the eNodeB, the scrambling sequence with the defined initialization value to the coded bits to obtain scrambled coded bits, wherein the scrambling sequence is applied per subframe to the PDSCH for a given block of $N_{acc}$ subframes, wherein $N_{acc}$ represents a number of subframes in the given block; and
  encoding, at the eNodeB, the scrambled coded bits for transmission to the UE via the PDSCH,
  wherein:
    $N_{acc}$ is set to 1 when the scrambled coded bits to be transmitted via the PDSCH form a system information block type 1 (SIB1) bandwidth reduced (BR);
    $N_{acc}$ is set to 4 for a frame structure type 1 and $N_{acc}$ is set to 10 for a frame structure type 2, when the scrambled coded bits to be transmitted via the PDSCH form a type of system information (SI) message other than a system information block type 1 (SIB1) bandwidth reduced (BR); and
    $N_{acc}$ is set to 4 for a frame structure type 1 and $N_{acc}$ is set to 10 for a frame structure type 2, when the scrambled coded bits to be transmitted via the PDSCH form a paging message.

9. The at least one non-transitory machine readable storage medium of claim 8, further comprising instructions when executed perform the following: applying a same scrambling sequence per subframe to the PDSCH for the given block of $N_{acc}$ subframes.

10. The at least one non-transitory machine readable storage medium of claim 9, further comprising instructions when executed perform the following: initializing the scrambling sequence for a $j^{th}$ block of the $N_{acc}$ subframes using the defined initialization value ($c_{init}$), wherein $c_{init}=n_{RNTI} \cdot 2^{14}+q \cdot 2^{13}+[(j_0+j)N_{acc} \mod 10] \cdot 2^9+N_{ID}^{cell}$, wherein $n_{RNTI}$ represents a radio network temporary identifier, q represents a given codeword, $j_0$ represents a first block in the $N_{acc}$ subframes, j represents a given block in the $N_{acc}$ subframes, and $N_{ID}^{cell}$ represents a cell identifier (ID).

11. The at least one non-transitory machine readable storage medium of claim 10, wherein:

$$j = 0, 1, \ldots , \left\lfloor \frac{i_0 + N_{abs}^{PDSCH} + i_\Delta - 1}{N_{acc}} \right\rfloor - j_0$$

$$j_0 = \lfloor (i_0 + i_\Delta)/N_{acc} \rfloor$$

$$i_\Delta = \begin{cases} 0, & \text{for frame structure type 1} \\ N_{acc} - 2, & \text{for frame structure type 2} \end{cases},$$

wherein $N_{abs}^{PDSCH}$ represents a total number of absolute subframes spanned by a PDSCH with repetition, $i_0$ represents an absolute subframe number of a first downlink subframe intended for the PDSCH, and $i_\Delta$ represents a change in the absolute subframe number.

12. The at least one non-transitory machine readable storage medium of claim 10, wherein the $n_{RNTI}$ is set to a system information radio network temporary identifier (SI-RNTI) when the scrambled coded bits form the SIB1 or the type of SI message other than the SIB1 BR.

13. The at least one non-transitory machine readable storage medium of claim 8, wherein the coded bits generated at the eNodeB form a code word.

* * * * *